United States Patent
Srey et al.

(10) Patent No.: US 6,823,173 B2
(45) Date of Patent: Nov. 23, 2004

(54) METHOD AND APPARATUS FOR ENABLING A QUICK REPEAT FEATURE

(75) Inventors: Lena Srey, Chicago, IL (US); Raouf Haddad, Tinley Park, IL (US)

(73) Assignee: Motorola, Inc., Schaumburg, IL (US)

( * ) Notice: Subject to any disclaimer, the term of this patent is extended or adjusted under 35 U.S.C. 154(b) by 52 days.

(21) Appl. No.: 10/140,271

(22) Filed: May 7, 2002

(65) Prior Publication Data

US 2004/0203422 A1 Oct. 14, 2004

(51) Int. Cl.[7] .................................................. H04B 7/00
(52) U.S. Cl. ........................ 455/59; 455/61; 455/67.11; 370/230; 375/299
(58) Field of Search .......................... 455/59, 61, 67.11, 455/67.13, 63.1, 101, 102, 103, 105; 370/230, 232–234; 375/299

(56) References Cited

U.S. PATENT DOCUMENTS 5,345,600 A * 9/1994 Davidson .................... 455/50.1
5,905,945 A * 5/1999 Hill et al. .................... 455/31.3

* cited by examiner

*Primary Examiner*—Lee Nguyen
(74) *Attorney, Agent, or Firm*—Marshall, Gerstein & Borun LLP

(57) ABSTRACT

A method (600) and a base station controller (120) for enabling a quick repeat feature are described herein. The base station controller (120) monitors an operating parameter associated with a mobile station (160). The base station controller (120) detects a condition suggesting a potential for a transmission failure to the mobile station (160) based on the operating parameter. The base station controller (120) provides a plurality of transmissions of an operating message to the mobile station (160) in response to detection of the condition suggesting a potential for a transmission failure to the mobile station (160). The operating message includes operating information associated with communication between a base station (140) and the mobile station (160).

34 Claims, 2 Drawing Sheets

METHOD AND APPARATUS FOR ENABLING A QUICK REPEAT FEATURE

TECHNICAL FIELD

The present disclosure relates to wireless communication systems, and more particularly, to a method and an apparatus for enabling a quick repeat feature.

BACKGROUND

A wireless communication system is a complex network of systems and elements. Typical systems and elements include (1) a radio link to mobile stations (e.g., a cellular telephone or a subscriber equipment used to access the wireless communication system), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a switching system, typically including a mobile switching center (MSC), to perform call processing within the system, and (5) a link to the land line, i.e., the public switch telephone network (PSTN) or the integrated services digital network (ISDN).

A base station subsystem (BSS) or a radio access network (RAN), which typically includes one or more base station controllers and a plurality of base stations, provides all of the radio-related functions. The base station controller provides all the control functions and physical links between the switching system and the base stations. The base station controller is also a high-capacity switch that provides functions such as handover, cell configuration, and control of radio frequency (RF) power levels in the base stations.

The base station handles the radio interface to the mobile station. The base station includes the radio equipment (transceivers, antennas, amplifiers, etc.) needed to service each communication cell in the system. A group of base stations is controlled by a base station controller. Thus, the base station controller operates in conjunction with the base station as part of the base station subsystem to provide the mobile station with real-time voice, data, and multimedia services (e.g., a call).

After a call is established (i.e., after service negotiation between the base station subsystem and the mobile station) and also throughout the call itself, for example, the base station subsystem may provide the mobile station with extended supplemental channel assignment messages (ESCAM) which include information such as when the mobile station may communicate with the base station subsystem and at what rate to do so. In particular, the base station controller sends a reverse ESCAM via the base station to the mobile station to indicate the time and the rate that the mobile station may transmit data to the base station. In contrast, the base station controller sends a forward ESCAM via the base station to the mobile station to indicate the time and the rate that the base station may transmit data to the mobile station.

To ensure that the mobile station receives the operating information in the ESCAM so that the mobile station operates properly, a quick repeat feature may be performed by the base station subsystem. That is, the base station controller generally transmits an ESCAM for a given number of times prior to processing data based on the ESCAM. For example, the base station controller may transmit a first ESCAM (e.g., a reverse ESCAM) for three times, which typically takes 320 milliseconds (msec). A second ESCAM (e.g., a forward ESCAM) may be stored in a queue until after the base station subsystem processes the three transmissions of the first ESCAM because the base station subsystem and the mobile station typically process only one ESCAM at a time. Thus, the second ESCAM may be late arriving to the mobile station which, in turn, may cause radio link protocol (RLP) resets (i.e., when data has been lost and an unsuccessful attempt to recover the lost data in a radio link) and low throughput. As a result of each RLP reset, the amount of processed data may be reduced.

One aspect of designing a wireless communication system is to optimize the resources available to the wireless communication system. That is, one method of improving the availability of resources is to reduce the amount of overhead bandwidth used, and the amount of power used for processing ESCAMs. As described in the above example, a base station controller may provide an ESCAM three times to the mobile station. However, the mobile station may be in good RF condition (i.e., little or no fading) and therefore, may not necessarily need three opportunities to receive the ESCAM. In other words, the mobile station may receive the first transmission of the ESCAM so that the second and third transmissions of the ESCAM may not be necessary. As a result, the overhead bandwidth and the processing power of the base station controller, the base station, and the mobile station may not be efficiently utilized.

Therefore, a need exist to control transmission of an operating message to optimize communication resources of a wireless communication system.

BRIEF DESCRIPTION OF THE DRAWINGS

This disclosure will describe several embodiments to illustrate its broad teachings. Reference is also made to the attached drawings.

DETAILED DESCRIPTION

Embodiments of a method and a base station controller for enabling a quick repeat feature are described herein. To illustrate the concept of a quick repeat feature, a base station controller in a wireless communication system may provide an operating message to a base station to transmit to a mobile station. The operating message may include operating information associated with communication between the base station and the mobile station. For example, the operating message may be an extended supplemental channel assignment message (ESCAM) including operating information such as, but not limited to, transmission schedule and transmission rate. The base station controller monitors an operating parameter associated with the mobile station. That is, the base station controller may monitor power level of a communication resource associated with the mobile station. For example, the base station controller may monitor signal-to-noise ratio (SNR) of a forward/reverse pilot channel (F/R-PICH) associated with the mobile station. Based on the operating parameter, the base station controller may detect a condition suggesting a potential for a transmission failure to the mobile station. The base station controller may detect, for example, a fading condition associated with the mobile station, or a condition suggesting a potential for a failure of a communication link between the base station and the mobile station. In particular, the base station controller may detect that a signal-to-noise ratio (SNR) deviation exceeds a threshold. The SNR deviation may be based on a nominal SNR value and a measured SNR value of a forward/reverse pilot channel (F/R-PICH) associated with the mobile station, i.e., a difference between the nominal SNR value and the measured SNR value. In another example, the SNR deviation may be a difference between the nominal SNR value and a sampled value of a plurality of measured SNR values. In response to detection of the condition suggesting a potential for a transmission failure to the mobile station, the base station controller may provide a plurality of transmissions of the operating message to the mobile station to compensate for the potential that the operating message may not arrive at the mobile station on the first transmission. Thus, the base station controller provides additional transmissions of the operating message to ensure that the mobile station receives operating information. For example, the base station controller may provide three transmissions of an ESCAM to the mobile station in response to detection of a fading condition caused by the surrounding environment (e.g., buildings and/or other obstructions). The base station controller may also provide a plurality of transmissions of the operating message in response to detection of a condition suggesting a potential for a failure of a communication link between the base station and the mobile station.

Figure 1:
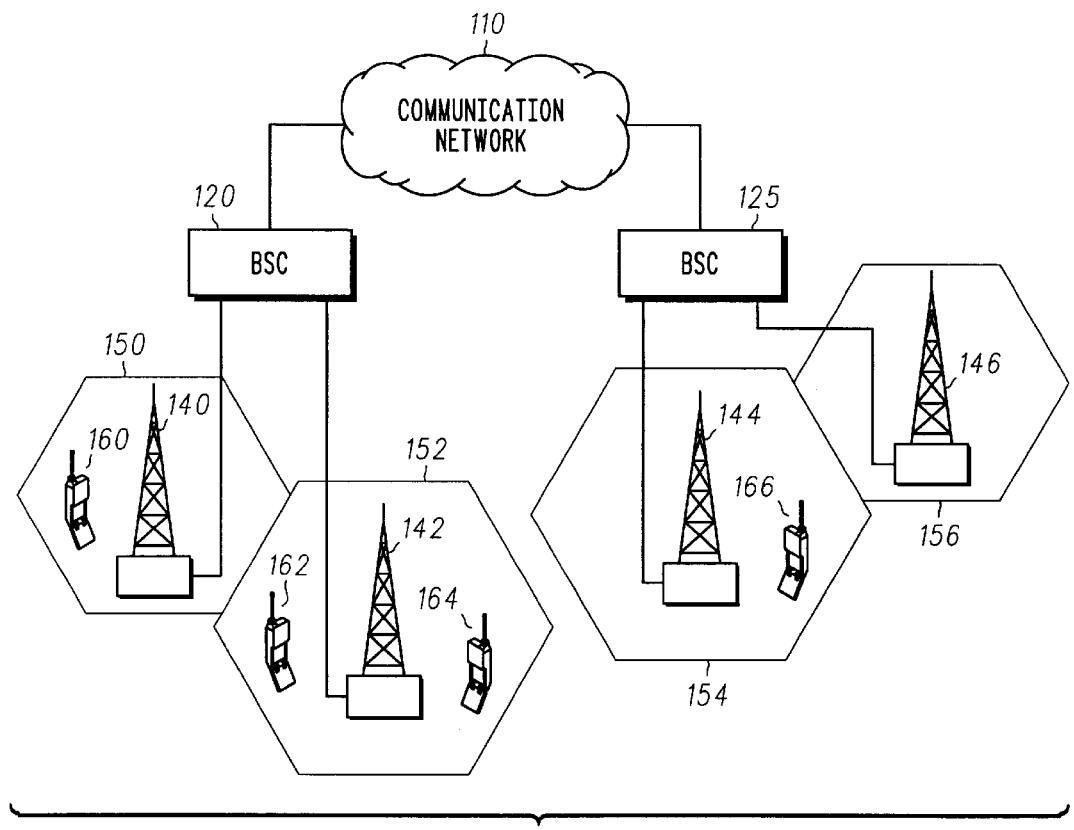
FIG. 1 is a block diagram representation of a wireless communication system.

A communication system is also described, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular, the IS-95 Code Division Multiple Access (CDMA) digital cellular, CDMA 2000, the Personal Communications System (PCS), 3G, the Universal Mobile Telecommunications System (UMTS) and variations and evolutions of these protocols. As shown in FIG. 1, a wireless communication system 100 includes a communication network 110, and a plurality of base station controllers (BSC), generally shown as 120 and 125, servicing a total service area 130. The wireless communication system 100 may be, but is not limited to, a frequency division multiple access (FDMA) based communication system, a time division multiple access (TDMA) based communication system, and code division multiple access (CDMA) based communication system. As is known for such systems, each BSC 120 and 125 has associated therewith a plurality of base stations (BS), generally shown as 140, 142, 144, and 146, servicing communication cells, generally shown as 150, 152, 154, and 156, within the total service area 130. The BSCs 120 and 125, and base stations 140, 142, 144, and 146 are specified and operate in accordance with the applicable standard or standards for providing wireless communication services to mobile stations (MS), generally shown as 160, 162, 164, and 166, operating in communication cells 150, 152, 154, and 156, and each of these elements are commercially available from Motorola, Inc. of Schaumburg, Ill.

Typically, the BSCs 120 and 125 provide operating messages to the plurality of mobile stations 160, 162, 164, and 166. The operating messages include operating information for communication between the base stations 140, 142, 144, and 146 and the plurality of mobile stations 160, 162, 164, and 166. To illustrate this concept, the BSC 120 may provide the base station 140 with an extended supplemental channel assignment message (ESCAM) to transmit to the mobile station 160. The base station 140 may monitor power level of a communication resource associated with the mobile station 160 (e.g., a forward/reverse pilot channel (F/R-PICH)), and then provide the base station controller 120 with power information associated with the power level. Based on the power information from the base station 140, the BSC 120 determines whether to enable a quick repeat feature, i.e., multiple transmissions of the ESCAM. For example, the BSC 120 may determine a signal-to-noise ratio (SNR) deviation of the mobile station 160 based on a nominal SNR value and a measured SNR value (i.e., a change between the nominal SNR value and the measured SNR value). The nominal SNR value may be a predetermined value from a simulation (i.e., in a vacuum environment) whereas the measured SNR value may be provided by the base station 140 after monitoring the communication resource associated with the mobile station 120 for a given time period. The BSC 120 compares the SNR deviation of the mobile station 160 with a threshold value. Accordingly, if the SNR deviation exceeds the threshold value, the BSC 120 may enable the quick repeat feature. Otherwise, the quick repeat feature is not enabled.

Alternatively, the BSC 120 determines the SNR deviation based on prior power information of a communication resource associated with the mobile station 160. For example, the BSC 120 may determine the SNR deviation by comparing the nominal SNR value with a calculated SNR value. The calculated SNR value may be, but is not limited to, a sample of a plurality of measured SNR values of an F/R-PICH associated with the mobile station 160 from a given period of time. The sample of the plurality measured SNR values may be calculated as one of ordinary skill in the art will readily recognize. As noted above, the BSC 120 compares the SNR deviation of the mobile station 160 with a threshold value. If the SNR deviation exceeds the threshold value, the quick repeat feature may be enabled.

By enabling the quick repeat feature, the base station controller 120 provides the ESCAM to the base station 140 which, in turn, transmits the ESCAM for a given number of times within a time interval on a forward/reverse supplemental channel (FIR-SCH) to the mobile station 160. For example, the base station 140 may transmit ESCAM three times within 320 milliseconds (msec) to the mobile station 160 (i.e., the base station 140 transmits an ESCAM every 160 ms). The ESCAM provides the mobile station 160 with operating information associated with communication between the base station 140 and the mobile station 160 such as, but not limited to, transmission schedule and transmission rate. The ESCAM may be, but is not limited to, a reverse ESCAM and a forward ESCAM. In particular, the reverse ESCAM provides the mobile station 160 with information indicating when and at what rate to transmit data to the base station 140 whereas the forward ESCAM provides the mobile station 160 with information indicating when and at what rate to receive data from the base station 140.

As noted above, the BSC 120 determines whether to enable the quick repeat feature based on operating parameter associated with the mobile station 160 such as, but not limited to, power level of a communication resource associated with the mobile station 160. The BSC 120 may not enable the quick repeat feature when the BSC 120 detects that the mobile station 160 is in a static condition, i.e., there is a good radio frequency (RF) communication link between the base station 140 and the mobile station 160. In particular, the BSC 120 determines that the SNR deviation as mentioned above does not exceed a threshold value. As a result, the BSC 120 may consecutively provide a first ESCAM and a second ESCAM to the base station 140 to transmit to the mobile station 160. That is, the BSC 120 and the base station 140 may process the second ESCAM without providing additional transmissions of the first ESCAM to the mobile station 160.

Figure 2:
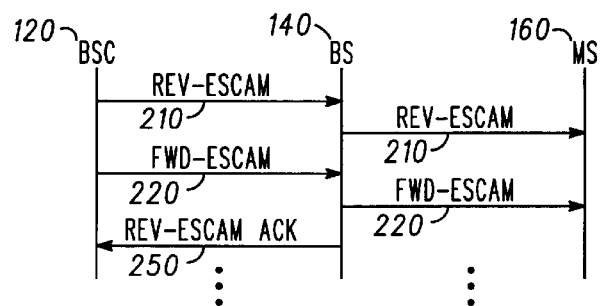
FIG. 2 is a flow diagram representation of a wireless communication system.

To illustrate this concept, the BSC 120 may consecutively provide a reverse-ESCAM (e.g., rev-ESCAM) 210 and a forward ESCAM (e.g., fwd-ESCAM) 220 to the base station 140 for transmission to the mobile station 160 as shown in FIG. 2. The BSC 120 provides the rev-ESCAM 210 to the base station 140 which, in turn, transmits the rev-ESCAM 210 to the mobile station 160. The base station 140 also provides an acknowledgment that the rev-ESCAM (i.e., rev-ESCAM ACK) 250 has been processed to the BSC 120 so that the BSC 120 may communicate with the mobile station 160 based on the operating information included in the rev-ESCAM 210. Accordingly, the BSC 120 may process data to/from the mobile station 160 based on, for example, the transmission schedule and transmission rate included in the rev-ESCAM 210. Without enabling the quick repeat feature, the BSC 120 may process the fwd-ESCAM 220 after the rev-ESCAM 210 is provided to the base station 140. As a result, the fwd-ESCAM 220 is not placed in a queue while the BSC 120 processes additional transmissions of the rev-ESCAM 210.

Figure 3:
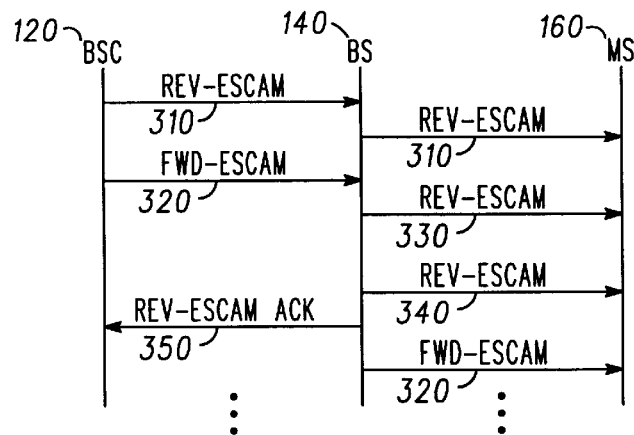
FIG. 3 is a flow diagram representation of a wireless communication system adapted to enable a quick repeat feature.

In contrast, the BSC 120 may detect a condition suggesting a potential for a transmission failure to the mobile station 160, e.g., there is a fading condition caused by the surrounding environment or a poor RF communication link between the base station 140 and the mobile station 160. That is, the BSC 120 determines that the SNR deviation as described above exceeds a threshold value. Accordingly, the BSC 120 may enable the quick repeat feature to compensate for the possibility that the ESCAM may not arrive at mobile station 160. Referring to FIG. 3, for example, the BSC 120 may provide the base station 140 with a first transmission of a rev-ESCAM 310 to transmit to the mobile station 160. However, the fwd-ESCAM 320 may be placed in a queue while the BSC 120 processes additional transmissions of the rev-ESCAM 310, which are generally shown as a second transmission and a third transmission of the rev-ESCAM 330 and 340. For example, the base station 140 may transmit the rev-ESCAM three times and the fwd-ESCAM may be placed in the queue for 240 ms when the quick repeat feature is enabled. After multiple transmissions of the rev-ESCAM 310, 330, and 340 to the mobile station 160, the base station 140 may provide the BSC 120 with the rev-ESCAM ACK 350 and then transmit the fwd-ESCAM 320 to the mobile station 160. Thus, the second and third transmissions of the rev-ESCAM 330, 340 may compensate for the absence of the first transmission of the rev-ESCAM 310 at the mobile station 160.

Figure 4:
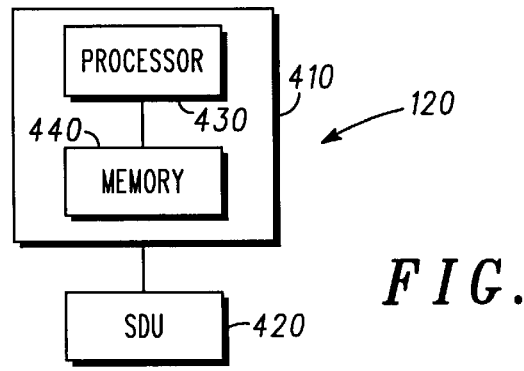
FIG. 4 is a block diagram representation of a base station controller.

As shown in FIG. 4, the BSC 120 is adapted to enable a quick repeat feature. The BSC 120 generally includes a controller 410 and a selection and distribution unit (SDU) 420. The controller 410 includes a processor 430 and a memory 440. The processor 430 is operatively coupled to the memory 440, which stores a program or a set of operating instructions for the processor 430. The processor 430 executes the program or the set of operating instructions such that the BSC 120 operates as described herein. The program or the set of operating instructions may be embodied in a computer-readable medium such as, but not limited to, paper, a programmable gate array, an application specific integrated circuit, an erasable programmable read only memory, a read only memory, a random access memory, a magnetic media, and an optical media. The SDU 420 provides an operating message including operating information associated with communication between a base station (e.g., base station 140 shown in FIG. 1) and a mobile station (e.g., mobile station 160 shown in FIG. 1). For example, the SDU 120 may provide the operating message to the base station 140 to transmit to the mobile station 160. Thus, the base station 140 and the mobile station 160 are in communication with each other based on the operating information, which may include, but is not limited to, transmission schedule and transmission rate.

A basic flow for enabling a quick repeat feature that may be applied with the BSC 120 shown in FIG. 4 may start with the controller 410 monitoring an operating parameter associated with the mobile station 160. The operating parameter may be, but is not limited to, signal-to-noise ratio (SNR) of a forward/reverse pilot channel (F/R-PICH) associated with the mobile station 160. Based on the operating parameter, the controller 410 determines whether there is a condition suggesting a potential for a transmission failure to the mobile station 160 (e.g., a fading condition as one of ordinary skill in the art will readily recognize). For example, the controller 410 may determine whether an SNR deviation exceeds a threshold. The SNR deviation may be based on a nominal SNR value, and one of a measured SNR value of the F/R-PICH and a sampled value of a plurality of measured SNR values of the F/R-PICH. If the SNR deviation does not exceed the threshold, then the quick repeat feature is not enabled. However, if the SNR deviation exceeds the threshold then the base station controller 120 enables the quick repeat feature. In particular, the SDU 420 may provide a plurality of transmissions of an operating message to the mobile station 160 during a given interval (e.g., within 320 ms). The operating message may be, but is not limited to, an extended supplemental channel assignment message (ESCAM) to provide the mobile station 160 with operating information such as transmission schedule and transmission rate. That is, the ESCAM provides the mobile station 160 with information as to when and at what rate to receive information from the base station and/or to transmit information to the base station. As a result, the plurality of transmissions of the ESCAM during the given interval may ensure that the mobile station 160 receives the operating information despite a condition suggesting a potential for a transmission failure to the mobile station 120 from the base station 140.

Figure 5:
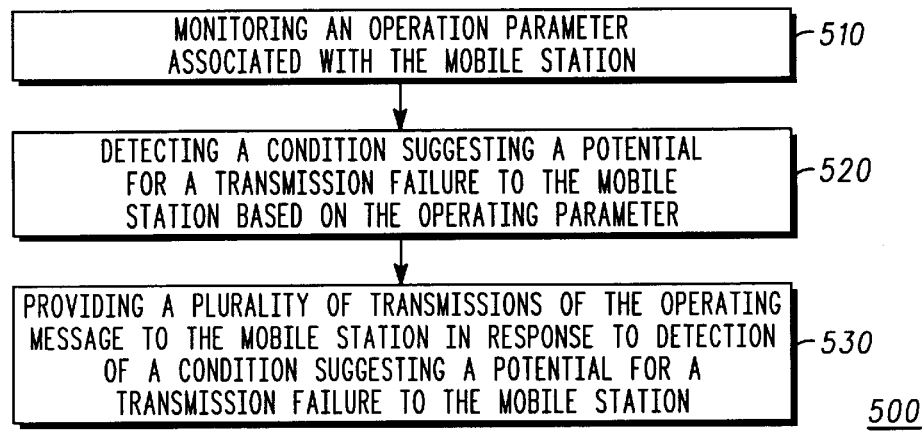
FIG. 5 is a flow diagram illustrating a method for implementing a quick repeat feature.

Referring to FIG. 5, a method 500 for enabling a quick repeat feature is shown. Method 500 begins at step 510, wherein a base station controller monitors an operating parameter associated with a mobile station. For example, the operating parameter may be, but is not limited to, power level of a communication resource associated with the mobile station such as signal-to-noise ratio (SNR) of a forward/reverse pilot channel (F/R-PICH) associated with the mobile station. Next, at step 520, the base station controller detects for a condition suggesting a potential for a transmission failure to the mobile station based on the operating parameter. That is, the base station controller may detect a fading condition or a condition suggesting a potential for a failure of a communication link between a base station and the mobile station, which may be caused by the surrounding environment of the mobile station such as buildings and/or other obstructions. To detect a condition suggesting a potential for a transmission failure to the mobile station, the base station controller may determine whether an SNR deviation exceeds a threshold. The SNR deviation may be based on a nominal SNR value and a measured SNR value of the F/R-PICH. In an alternate embodiment, the SNR deviation may be based on the nominal SNR value and a sampled value of a plurality of measured SNR values of the F/R-PICH. In response to detection of a condition suggesting a potential for a transmission failure to the mobile station (i.e., the SNR deviation exceeds the threshold), the base station controller at step 530 provides a plurality of transmissions of an operating message to the mobile station. The operating message may be, but is not limited to, an extended supplemental channel assignment message (ESCAM) including operating information such as transmission schedule and transmission rate. For example, the base station controller may provide three transmissions of the ESCAM to the mobile station to compensate for the potential that the operating message may not arrive at the mobile station on the first transmission, and to ensure that mobile station receives the operating information to operate properly. As a result, the base station controller optimizes the available communication resources but also ensures that the mobile station receives the operating information to communicate with the base station.

Many changes and modifications to the embodiments described herein could be made. The scope of some changes is discussed above. The scope of others will become apparent from the appended claims.

What is claimed is:

1. In a wireless communication system, wherein a base station transmits an operating message to a mobile station, and wherein the operating message includes operating information associated with communication between the base station and the mobile station, a method for enabling a quick repeat feature, the method comprising:

monitoring an operating parameter associated with the mobile station;

detecting a condition suggesting a potential for a transmission failure to the mobile station based on the operating parameter;

enabling the quick repeat feature for transmission of the operating message, the quick repeat feature comprising a plurality of rapid, successive transmissions of the operating message; and transmitting the operating message to the mobile station in accordance with the quick repeat feature, wherein a plurality of transmissions of an extended supplemental channel assignment message (ESCAM) are made to the mobile station.

2. The method of claim 1, wherein the step of monitoring an operating parameter associated with the mobile station comprises monitoring power level of a communication resource associated with the mobile station.

3. The method of claim 1, wherein the step of monitoring an operating parameter associated with the mobile station comprises monitoring signal-to-noise ratio (SNR) of a forward/reverse pilot channel (F/R-PICH) associated with the mobile station.

4. The method of claim 1, wherein the step of detecting a condition suggesting a potential for a transmission failure to the mobile station based on the operating parameter comprises detecting a fading condition based on the operating parameter.

5. The method of claim 1, wherein the step of detecting a condition associated with the mobile station based on the operating parameter comprises detecting a condition suggesting a potential for a failure of a communication link between the base station and the mobile station based on the operating parameter.

6. The method of claim 1, wherein the step of detecting a condition associated with the mobile station based on the operating parameter comprises detecting a signal-to-noise (SNR) deviation exceeding a threshold, wherein the SNR deviation is based on a nominal SNR value and a measured SNR value of a forward/reverse pilot channel (F/R-PICH) associated with the mobile station.

7. The method of claim 1, wherein the step of detecting a condition associated with the mobile station based on the operating parameter comprises detecting a signal-to-noise (SNR) deviation exceeding a threshold, wherein the SNR deviation is based on a nominal SNR value and a sampled value of a plurality of measured SNR values of a forward/reverse pilot channel (F/R-PICH) associated with the mobile station.

8. The method of claim 1, wherein the step of transmitting the operating message to the mobile station comprises providing three transmissions of the extended supplemental channel assignment message (ESCAM) to the mobile station in response to the detection of a fading condition associated with the mobile station.

9. The method of claim 1, wherein the step of transmitting the operating message to the mobile station comprises providing a plurality of transmissions of information associated with one of transmission schedule and transmission rate to the mobile station in response to detection of the condition associated with the mobile station.

10. The method of claim 1, wherein the step of transmitting the operating message to the mobile station comprises providing a plurality of transmissions of the operating message to the mobile station in response to detection of a signal-to-noise (SNR) deviation exceeding a threshold, wherein the SNR deviation is based on a nominal SNR value and a measured SNR value of a forward/reverse pilot channel (F/R-PICH) associated with the mobile station.

11. The method of claim 1, wherein the step of transmitting the operating message to the mobile station comprises providing a plurality of transmissions of the operating message to the mobile station in response to detection of a signal-to-noise (SNR) deviation exceeding a threshold, wherein the SNR deviation is based on a nominal SNR value and a sampled value of a plurality of measured SNR values of a forward/reverse pilot channel (F/R-PICH) associated with the mobile station.

12. The method of claim 1, wherein the communication system comprises a code division multiple access (CDMA) based communication system.

13. In a wireless communication system, wherein an operating message includes operating information associated with communication between the base station and the mobile station, and wherein a base station controller is operable to enable a quick repeat feature, the quick repeat feature comprising rapid, successive transmission of the operating message, the base station controller comprising:

a controller having a processor and a memory operatively coupled to the processor, the controller being programmed to monitor an operating parameter associated with the mobile station,
 the controller being programmed to detect a condition associated with the mobile station based on the operating parameter;
 the controller being programmed to enable the quick repeat feature; and
 a selection and distribution unit operatively coupled to the controller, the selection and distribution unit being operable to transmit the operating message according to the quick repeat feature, wherein the operating message comprises an extended supplemental channel assignment message (ESCAM), wherein the extended supplemental channel assignment message comprises information associated with one of transmission schedule and transmission rate.

14. The base station controller of claim 13, wherein the operating parameter comprises power level of a communication resource associated with the mobile station.

15. The base station controller of claim 13, wherein the operating parameter comprises signal-to-noise ratio (SNR) of a forward/reverse pilot channel (F/R-PICH) associated with the mobile station.

16. The base station controller of claim 13, wherein the condition associated with the mobile station comprises a fading condition associated with the mobile station.

17. The base station controller of claim 13, wherein the condition associated with the mobile station comprises a condition suggesting a potential for a failure of a communication link between the base station and the mobile station.

18. The base station controller of claim 13, wherein the condition associated with the mobile station comprises a signal-to-noise (SNR) deviation exceeding a threshold, wherein the SNR deviation is based on a nominal SNR value and a measured SNR value of a forward/reverse pilot channel (F/R-PICH) associated with the mobile station.

19. The base station controller of claim 13, wherein the condition associated with the mobile station comprises a signal-to-noise (SNR) deviation exceeding a threshold, wherein the SNR deviation is based on a nominal SNR value and a sampled value of a plurality of SNR values of a forward/reverse pilot channel (F/R-PICH) associated with the mobile station.

20. The base station controller of claim 13, wherein the quick repeat feature comprises three transmissions of the extended supplemental channel assignment message (ESCAM).

21. The base station controller of claim 13, wherein the base station controller operates in accordance with a code division multiple access (CDMA) based communication protocol.

22. In a wireless communication system, wherein an operating message includes operating information associated with communication between the base station and the mobile station, and wherein a processor operates in accordance with a computer program embodied on a computer-readable medium for enabling a quick repeat feature, the quick repeat feature comprising rapid, successive transmissions of the operating message, the computer program comprising:

a first routine that directs the processor to monitor an operating parameter associated with the mobile station;
 a second routine that directs the processor to detect a condition associated with mobile station based on the operating parameter;
 a third routine to enable the quick repeat feature; and
 a fourth routine that directs the processor to transmit the operating message according to the quick repeat feature, the fourth routine comprises a routine that directs the processor to transmit a plurality of transmissions of an extended supplemental channel assignment message (ESCAM) to the mobile station in response to detection of the condition associated with the mobile station.

23. The computer program of claim 22, wherein the first routine comprises a routine that directs the processor to monitor power level of a communication resource associated with the mobile station.

24. The computer program of claim 22, wherein the first routine comprises a routine that directs the processor to monitor signal-to-noise ratio (SNR) of a forward/reverse pilot channel (F/R-PICH) associated with the mobile station.

25. The computer program of claim 22, wherein the second routine comprises a routine that directs the processor to detect a fading condition associated with the mobile station based on the operating parameter.

26. The computer program of claim 22, wherein the second routine comprises a routine that directs the processor to detecting a condition suggesting a potential for a failure of a communication link between the base station and the mobile station based on the operating parameter.

27. The computer program of claim 22, wherein the second routine comprises a routine that directs the processor to detect a signal-to-noise (SNR) deviation exceeding a threshold, wherein the SNR deviation is based on a nominal SNR value and a measured SNR value of a forward/reverse pilot channel (F/R-PICH) associated with the mobile station.

28. The computer program of claim 22, wherein the second routine comprises a routine that directs the processor to detect a signal-to-noise (SNR) deviation exceeding a threshold, wherein the SNR deviation is based on a nominal SNR value and a sampled value of a plurality of SNR values of a forward/reverse pilot channel (F/R-PICH) associated with the mobile station.

29. The computer program of claim 22, wherein the fourth routine comprises a routine that directs the processor to transmit three transmissions of the extended supplemental channel assignment message (ESCAM) to the mobile station in response to the detection of a fading condition associated with the mobile station.

30. The computer program of claim 22, wherein the fourth routine comprises a routine that directs the processor to transmit a plurality of transmissions of information associated with one of transmission schedule and transmission rate to the mobile station in response to detection of the condition associated with the mobile station.

31. The computer program of claim 22, wherein the fourth routine comprises a routine that directs the processor to transmit a plurality of transmissions of the operating message to the mobile station in response to detection of a signal-to-noise (SNR) deviation exceeding a threshold, wherein the SNR deviation is based on a nominal SNR value and a measured SNR value of a forward/reverse pilot channel (F/R-PICH) associated with the mobile station.

32. The computer program of claim 22, wherein the fourth routine comprises a routine that directs the processor to transmit a plurality of transmissions of the operating message to the mobile station in response to detection of a signal-to-noise (SNR) deviation exceeding a threshold, wherein the SNR deviation is based on a nominal SNR value and a sampled value of a plurality of measured SNR values of a forward/reverse pilot channel (F/R-PICH) associated with the mobile station.

33. The computer program of claim 22, wherein the computer program operates in accordance with a code division multiple access (CDMA) based communication protocol.

34. The computer program of claim 22, wherein the medium is one of paper, a programmable gate array, application specific integrated circuit, erasable programmable read only memory, read only memory, random access memory, magnetic media, and optical media.

* * * * *